(12) United States Patent
Walter

(10) Patent No.: US 9,339,017 B1
(45) Date of Patent: May 17, 2016

(54) LIVING WAVE BARRIER

(71) Applicant: David Walter, Orange Beach, AL (US)

(72) Inventor: David Walter, Orange Beach, AL (US)

(*) Notice: Subject to any disclaimer, the term of this patent is extended or adjusted under 35 U.S.C. 154(b) by 13 days.

(21) Appl. No.: 13/712,432

(22) Filed: Dec. 12, 2012

(51) Int. Cl.
*A01K 61/00* (2006.01)
*E02B 3/04* (2006.01)

(52) U.S. Cl.
CPC .............. *A01K 61/006* (2013.01); *E02B 3/046* (2013.01)

(58) Field of Classification Search
CPC ....... A01K 61/006; A01K 61/00; E02B 3/046
USPC ......... 119/207, 208, 221, 209, 210, 222, 238, 119/237, 239–241; 405/15–35
See application file for complete search history.

(56) References Cited

U.S. PATENT DOCUMENTS

| 227,483 | A | | 5/1880 | Case | |
|---|---|---|---|---|---|
| 315,384 | A | | 4/1885 | Boynton | |
| 905,596 | A | | 12/1908 | Smith | |
| 1,002,161 | A | * | 8/1911 | Lambert | 405/286 |
| 2,474,786 | A | | 6/1949 | Humphrey | |
| 3,741,159 | A | * | 6/1973 | Halaunbrenner | 119/240 |
| 4,397,578 | A | * | 8/1983 | Inman | 405/33 |
| 4,431,337 | A | | 2/1984 | Iwasa | |
| 4,840,516 | A | * | 6/1989 | Rambo | 405/33 |
| 5,071,285 | A | * | 12/1991 | Van Doren | 405/25 |
| 5,762,448 | A | * | 6/1998 | Bilanin | 405/73 |
| 5,803,660 | A | * | 9/1998 | Warren et al. | 405/25 |
| 6,189,188 | B1 | * | 2/2001 | O'Hare | 27/1 |
| 6,896,445 | B1 | * | 5/2005 | Engler | 405/25 |
| 7,024,735 | B1 | * | 4/2006 | Huggins | 27/1 |
| 7,144,196 | B1 | | 12/2006 | Campbell et al. | |
| 7,827,937 | B1 | | 11/2010 | Walter | |
| 8,033,250 | B2 | | 10/2011 | Calinski | |
| 2003/0138296 | A1 | * | 7/2003 | O'Hare | 405/25 |
| 2004/0120768 | A1 | | 6/2004 | Yang | |
| 2005/0238431 | A1 | | 10/2005 | Buchenroth, III | |
| 2008/0223304 | A1 | * | 9/2008 | Froyland | 119/209 |
| 2013/0118413 | A1 | * | 5/2013 | Bennett | 119/200 |

FOREIGN PATENT DOCUMENTS

| JP | 60233217 | 11/1985 | | |
|---|---|---|---|---|
| WO | WO 0177443 A1 | * | 10/2001 | A01K 61/006 |
| WO | WO 2011079346 A1 | * | 7/2011 | A01K 61/006 |

* cited by examiner

Primary Examiner — Joshua Huson
(74) Attorney, Agent, or Firm — Michael I. Kroll

(57) ABSTRACT

A living wave barrier is disclosed. The barrier is made up of a plurality of habitat modules that have cooperating depending footer elements and recesses in the bottom and top sides, respectively. The footer elements are spaced to allow limited free flow of water around the modules. Environmental elements, such as stones and the like, are disposed on the modules to provide a suitable habitat for local aquatic life and further removable elements may be provided to contain oyster spat. The barrier may be attached to an existing pier by way of a throughbore in each of the modules or may stand alone secured on the seabed by a pad. The barrier provides wave attenuation and may also be used to create a recreational area such as a snorkeling park or artificial reef.

9 Claims, 12 Drawing Sheets

LIVING WAVE BARRIER

BACKGROUND OF THE INVENTION

1. Field of the Invention

The present invention relates generally to artificial reefs and, more specifically, to a stackable habitat module with an anchoring base that when used alone, or in combination with a piling, serves as a marine habitat. When the habitat modules are stacked above the mean high tide the unit serves to attenuate waves and when a plurality of the units are positioned together in a spaced relationship they form a living wave barrier.

The stackable habitat module can also be used in the plurality to form a vertical pile that can be used in combination with a base module support platform to form a marine habitat that can be placed under a pier.

The habitat module has a platform portion and a footer portion with the platform portion having a top side and a bottom side with the platform portion having a throughbore whereby the module can be mounted on a piling when used, diagonal recesses serving as footer receptacle for another habitat module stacked thereon and optionally one or more removable portions that can be seeded with oyster spat with the remainder of the top surface optionally providing for fixedly attaching articles, such as stones and rocks, thereto.

The footer portion is a plurality of platform diagonal footings whereby the tides and currents freely flow through the module continuously permeably flushing the module to maintain water quality.

2. Description of the Prior Art

There are other marine devices which provide for establishing a marine habitat. While these marine devices may be suitable for the purposes for which they where designed, they would not be as suitable for the purposes of the present invention as heretofore described.

It is thus desirable to provide a marine habitat module having a platform portion and a footer portion with the platform portion having a throughbore whereby one or more of the habitat modules can be mounted onto a piling.

It is further desirable to provide a habitat module having a footer portion comprising panel-like footers that are diagonally positioned relative to the platform thereby creating venturi-like openings on each side of the habitat module.

SUMMARY OF THE PRESENT INVENTION

A primary object of the present invention is to provide a stackable marine habitat module.

Another object of the present invention is to provide a stackable marine habitat module having a platform portion with a throughbore passing therethrough and an integral footer portion.

Yet another object of the present invention is to provide a stackable marine habitat module wherein said platform portion has a top side and a bottom side with the top side having a plurality of diagonal recesses forming receptacles for a respective panel-like footer of the module above.

Still yet another object of the present invention is to provide a stackable marine habitat module wherein said platform portion optionally provides for at least one removable portion that can be seeded with oyster spat then placed back into a respective platform cavity.

An additional object of the present invention is to provide a stackable marine habitat module wherein said platform portion top side provides arrayed spaces between the panel-like footers for optionally attaching articles, such as rocks and stones thereto.

A further object of the present invention is to provide a stackable marine habitat module having an integral footer portion comprising panel-like footers diagonally positioned relative to the platform portion.

A yet further object of the present invention is to provide a stackable marine habitat module having panel-like footers diagonally positioned to form venturi-like opening on each side of the module so that the ebb and flow of the tides will continuously flush the module to maintain water quality.

A still yet further object of the present invention is to provide a stackable marine habitat module which can be stacked to form a vertical pile that is placed on a pad under a pier to encourage development of a marine habitat.

Another object of the present invention is to provide a stackable marine habitat module wherein a vertical stack of habitat modules each have at least one removable portion that can be seeded with oyster spat and then replaced into the respective cavity to develop an oyster colony to filter pollutants from the water.

Yet another object of the present invention is to provide a stackable marine habitat module that can be used to create a vertical pile of habitat modules mountable onto a piling that has a stop washer fixedly attached to a base module support platform to allow the vertical pile of habitat modules to be placed onto said piling and supported and stabilized by the washer and the support platform to form an anchored marine habitat.

Still yet another object of the present invention is to provide an anchored marine habitat wherein the habitat modules are stacked to the height of mean high tide therein forming a living wave barrier unit to provide means for wave attenuation when configured in a line offshore.

An additional object of the present invention is to provide a living wave barrier of varying lengths and configurations comprising a plurality of spaced apart living wave barrier units adapted to the local conditions.

A further object of the present invention is to provide a plurality of spaced apart habitat modules that can be stacked with or without a piling anchor to form a snorkeling reef.

Additional objects of the present invention will appear as the description proceeds.

The present invention overcomes the shortcomings of the prior art by providing a number of stackable habitat modules that when used in combination with a piling, a piling washer, and a base module support platform will serve as a marine habitat. When the habitat modules are stacked above the mean high tide the units serve to attenuate waves and when a plurality of the units are positioned linearly they form a living wave barrier.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
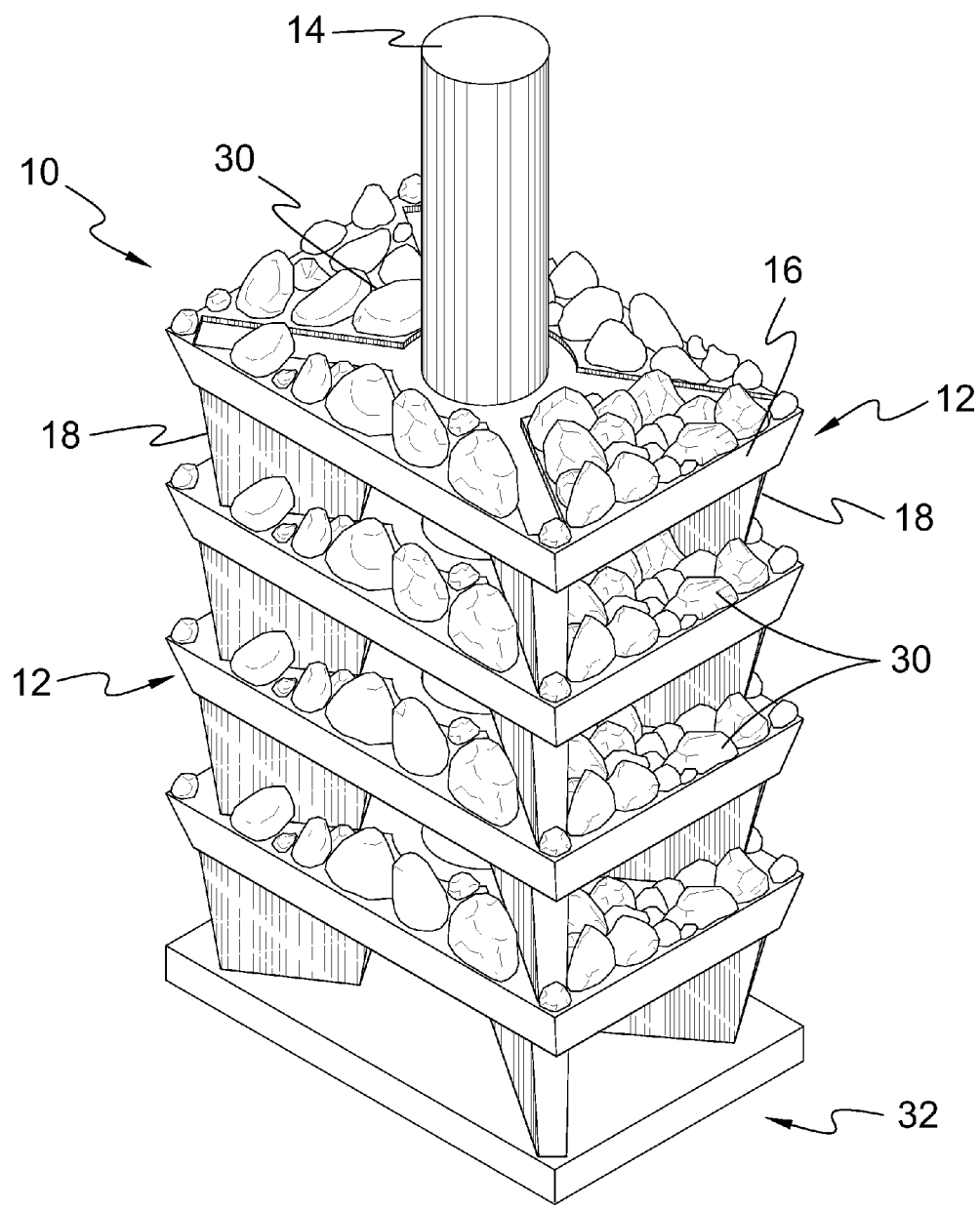
FIG. 1 is an illustrative view of the living wave barrier.

Turning now descriptively to the drawings, in which similar reference characters denote similar elements throughout the several views, the figures illustrate the use of the present invention. With regard to the reference numerals used, the following numbering is used throughout the various drawing figures.

10 Living wave barrier
12 Habitat module
14 Piling
16 Module platform
18 Footings
20 Platform edges
22 Platform throughbore
24 Platform top
26 Removable platform top portion
28 Platform footing alignment recess
32 Module support platform
34 Platform bottom surface
36 Platform housing interior rebar
38 Module support platform washer
40 Module support platform throughbore
S Sea
B Seabed
W Water height
A1 Module support platform mounting arrows
A2 Habitat module mounting arrows
R1 Inshore wave direction
R2 Attenuated wave direction

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 2:
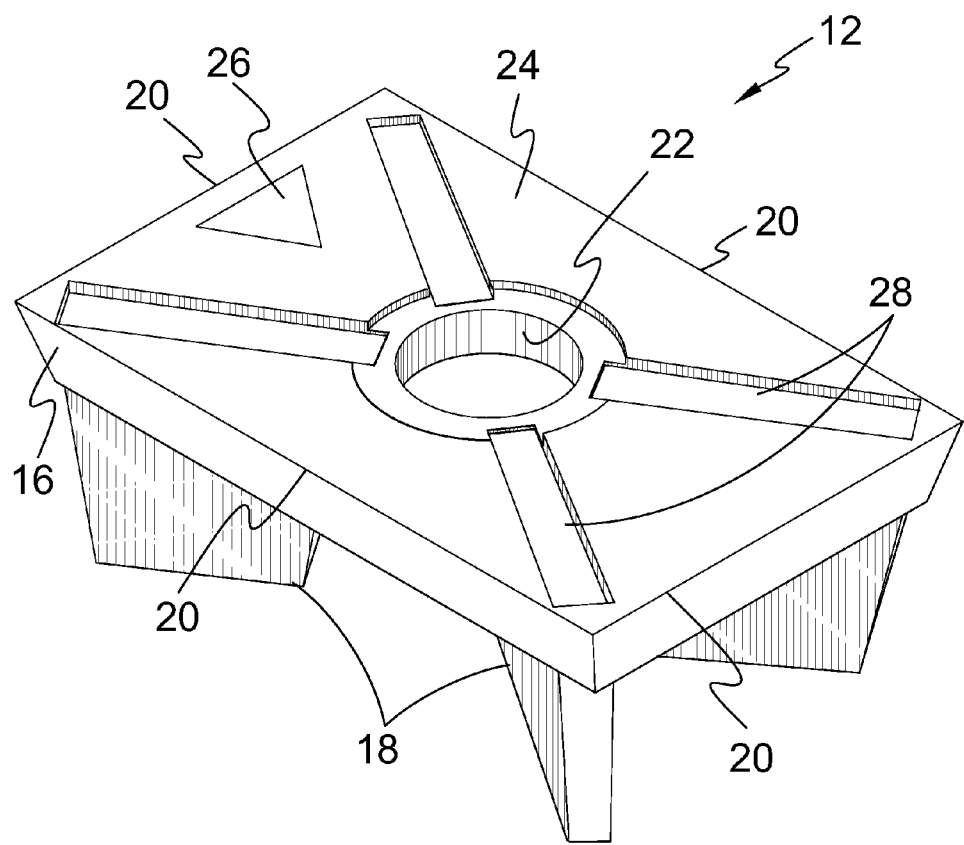
FIG. 2 is a perspective view of the stackable habitat module of the present invention.

Referring to FIG. 1, shown is an illustrative view of the living wave barrier 10. The present invention is a marine habitat module 12 that when stacked, one upon the other, together with an anchored piling 14, and a base module support platform 32 form a living wave barrier 10. The marine habitat module 12 is comprised of a platform 16 with diagonally oriented footings 18 that allow the ebb and flow of the tides to pass through the module 12 thereby providing continuous regular flushing to maintain water quality. Referring to FIG. 2, the module 12 further incorporates a platform throughbore 22 for mounting a plurality of the habitat modules 12 onto a piling 14. The top 24 of each stackable module 12 optionally provides for the addition of an assemblage of articles, such as rocks and stones (indicated at 30 in the various Figures), attached through a cementing agent. Other articles, such as screens or manufactured tubes could be used in the assemblage to provide the appropriate environment, depending on the biosphere that the living wave barrier 10 is installed in. The module 12 also optionally provides removable platform top portions 26 for the purpose of soaking in oyster spat or the like and then reinstalling the portions 26 onto the platform thereby providing a specific substrate for marine life. Varying the height of the platform footings 18 changes the spacing between the platforms and the height of the articles 30 that can be attached to the platform. Furthermore, extending the pile above mean tide provides means for wave attenuation.

In the perspective view of the stackable habitat module 12 seen in FIG. 2 illustrated is the platform portion 16 and a footer portion 18 with the platform portion having edges 20 around its periphery, a throughbore 22 and a top surface 24 for optionally fixedly attaching articles, such as stones and rocks, thereto. The footer portion 18, in the embodiment described herein, is located on proximate the bottom surface 34 (seen in FIG. 6) and consists of a number of diagonally set footings positioned such that the tides may freely flow through and around the module 12 when necessary and thus flushing in and around the articles 30 to maintain adjacent water quality. For ease of assembly and stability the top of the platform portion provides footing alignment recesses 28 so that when one module 12 is stacked upon another (as seen in FIGS. 1, 3, 5, 10, and 11) the footings positioned within the respective recess 28 insures proper vertical alignment of the stacked habitat platform/modules 12 and prevents casual displacement during use and as a guide so that when cementitiously applied articles are attached to the platform surface they are spaced away from the footing recesses 28. It should be emphasized that the diagonal configuration of the footers 18 as shown herein is only one of many that could be used to allow for the free flow of water about the modules 12 accounted by tides, waves, or currents. Also, as mentioned above, optionally provided is a removable platform portion 26 that can be seeded with oyster spat (or the like) and then replaced seasonally, or as desired.

Figure 3:
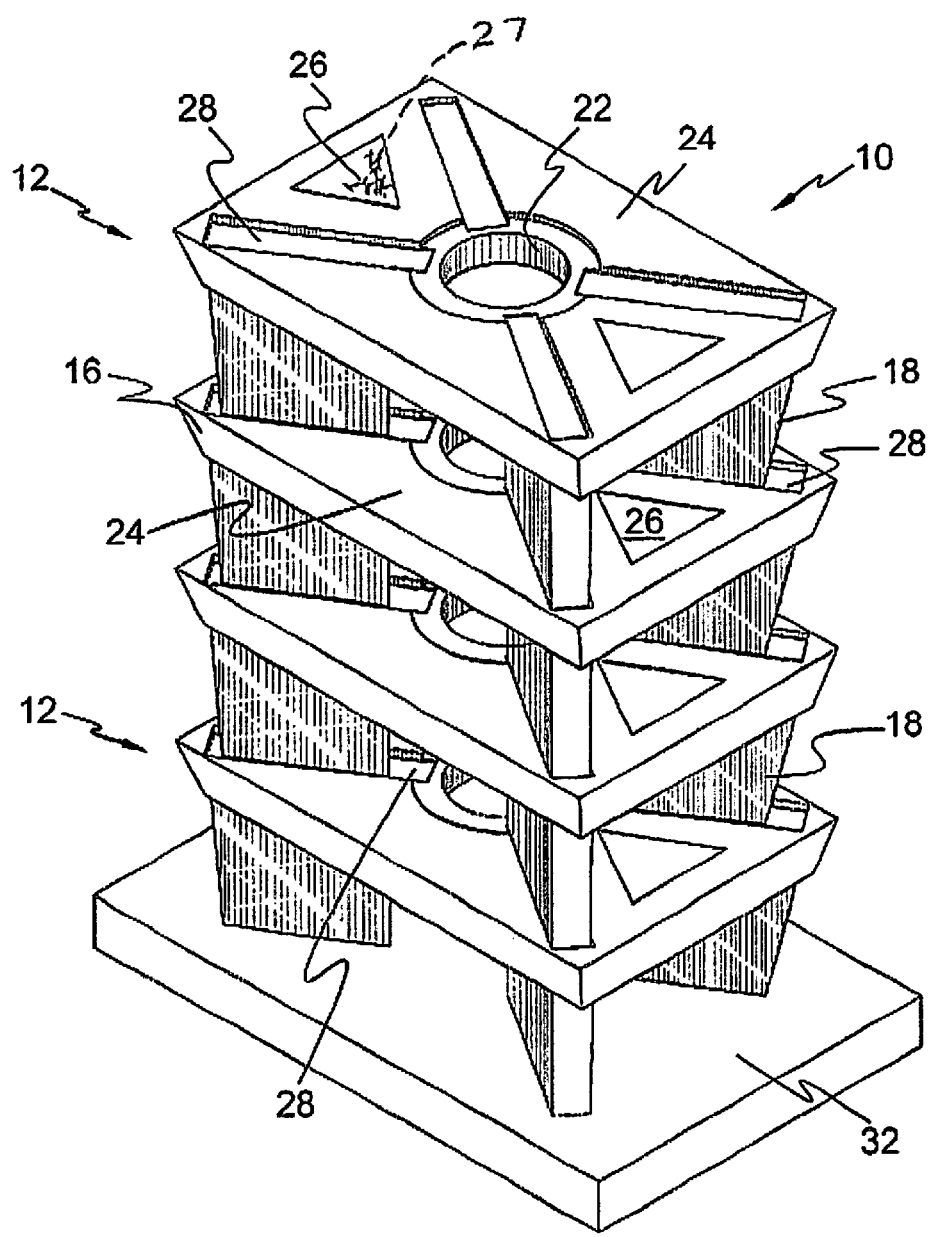
FIG. 3 is an illustrative view of the stackable habitat modules optionally incorporating a base module support platform.

Referring to FIG. 3, shown is an illustrative view of the living wave barrier 10 with a number of stackable habitat modules 12 incorporating an optional base module support platform 32. Each of the stackable habitat platform/modules 12 form a basic marine habitat component that when stacked (as seen in the various Figures) create a substantially vertical structure to provide the living wave barrier 10. In some of the embodiments described herein, the living wave barrier 10 incorporates a piling 14 having a piling anchor (as will be described later herein) and a base module support platform 32 located at the bottom of the piling 14. However, it is not always practical or possible to sink a piling, under an existing pier or offshore, therefore, the present invention also provides for a vertical pile of habitat modules 12 placed onto the base module support platform 32 as seen in the Figure thereby encouraging establishment of a marine habitat under a pier or other desired location. It has been estimated that adult oysters can filter 12 to 50 gallons of water a day making the establishment of a vertical stack or stacks seeded with oyster spat an ideal method for maintaining pier or beach water quality.

Also illustrated in FIG. 3 is the oyster spat 27 located under the removable platform portion 26.

Figure 4:
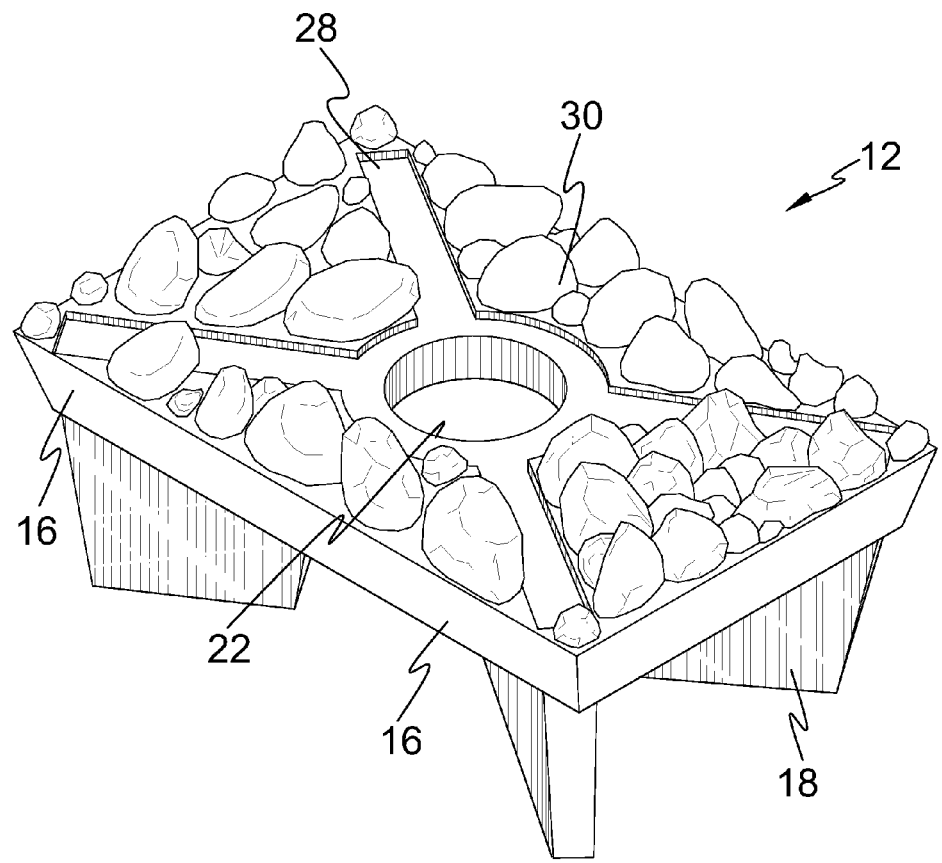
FIG. 4 is a perspective view of a stackable habitat module incorporating platform attached articles.

Referring to FIG. 4, shown is a perspective view of a stackable habitat module 12 incorporating platform attached articles 30. Illustrated is a stackable habitat module 12 having a platform portion 16 and a footer portion 18 with the platform portion providing a marine ecosystem for small marine life by fixedly attaching articles 30 to the top 24 (seen in FIG. 2) of the platform 16 and the footer portion having diagonally oriented footer supports 18 that allow water to freely pass through and around the module 12 continuously flushing the module.

Figure 5:
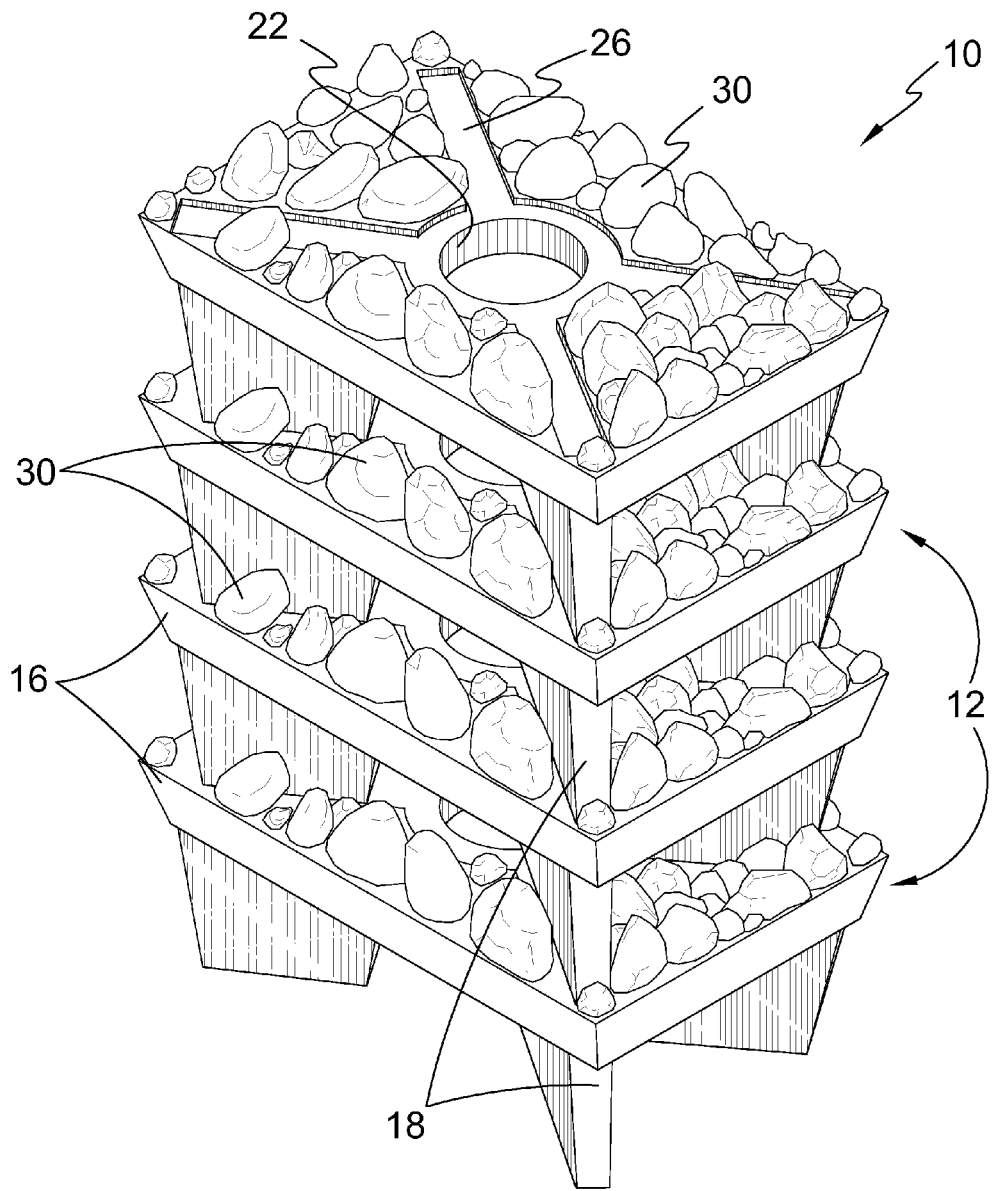
FIG. 5 is an illustrative view of stacked habitat modules of the present invention.

Referring to FIG. 5, shown is an illustrative view of stacked habitat modules 12 of the present invention. Each has a platform portion 16 and a footer portion 18 with the platform portion 16 having a plurality of cementitiously applied optional articles (indicated at 30) on the top surface 24 providing a marine ecosystem for small marine life and the footer portion 18 having diagonal footer supports allowing water to freely pass through all the modules. The height of the footers determines the maximum height of the articles that may be attached to the platform's top surface 24.

Figure 6:
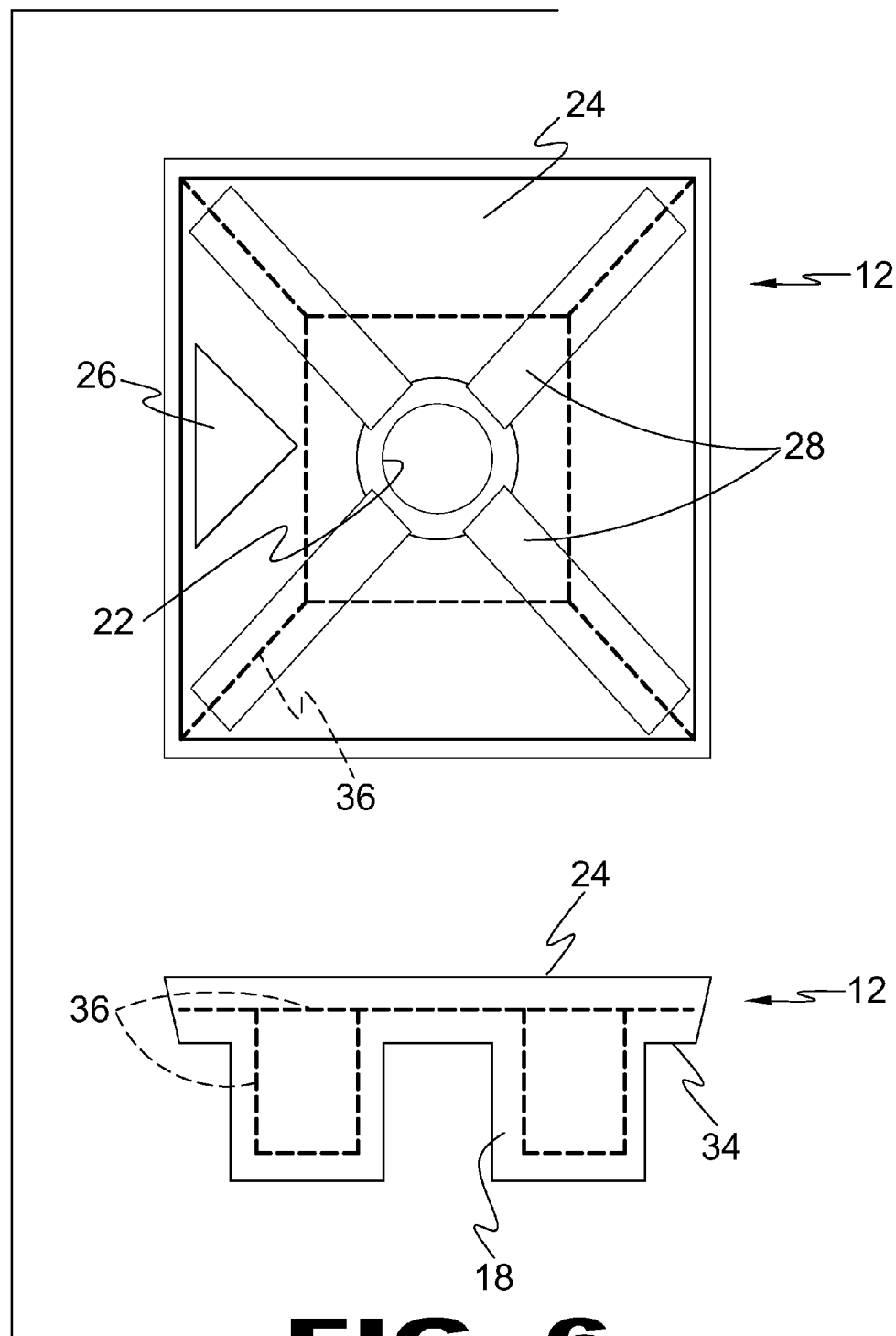
FIG. 6 is a top and side plan view of the stackable habitat module of the present invention.

Referring to FIG. 6, shown is a top and side plan view of the stackable habitat module 12 of the present invention. Illustrated are a top and side view of the habitat module housing depicting interior housing reinforcing rebar 36. It should be noted here that the body of the habitat module could be made of any number of materials with resistance to the corrosive effects of salt water being kept in mind. Various types of plastics, metal, stone or concrete aggregate, or glass type material could be used. The same applied to the rebar material 36, it being made of a reinforcing substance sufficient to maintain the integrity of the platform/modules 12 under expected storm (or other stress) conditions.

Figure 7:
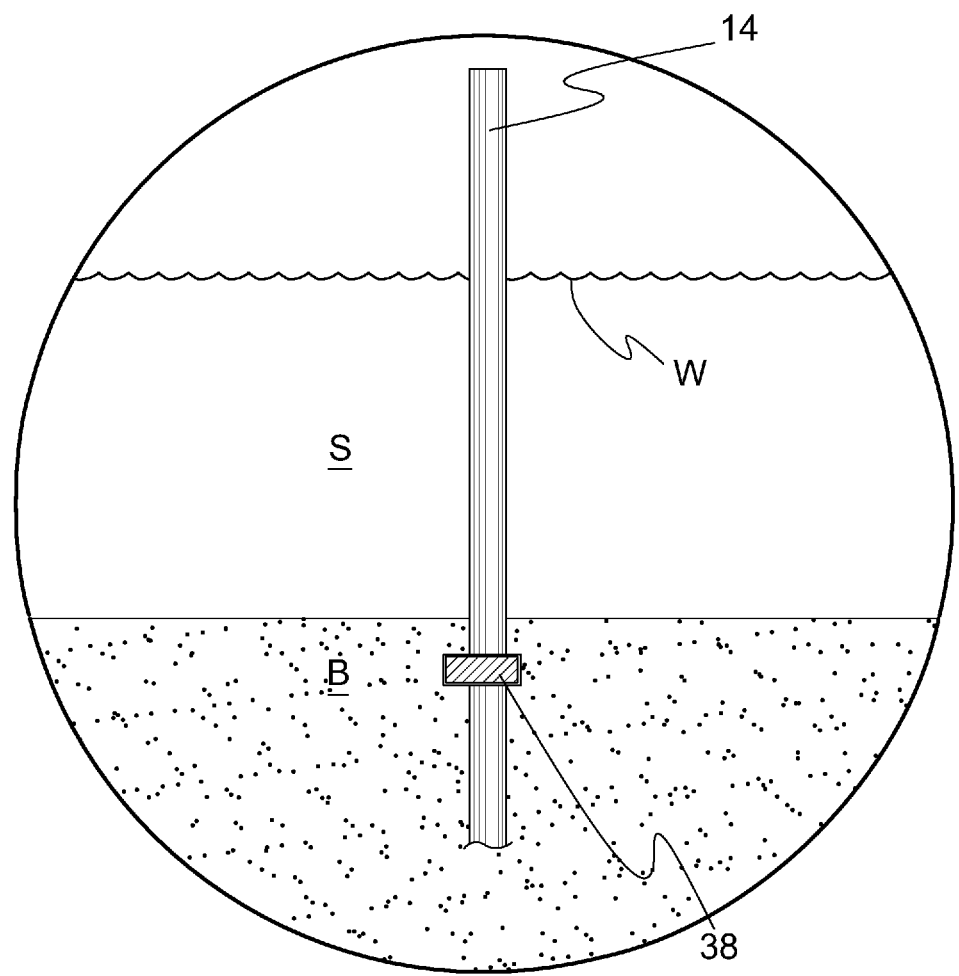
FIG. 7 is a side view of the assembly process for the living wave barrier.
Figure 8:
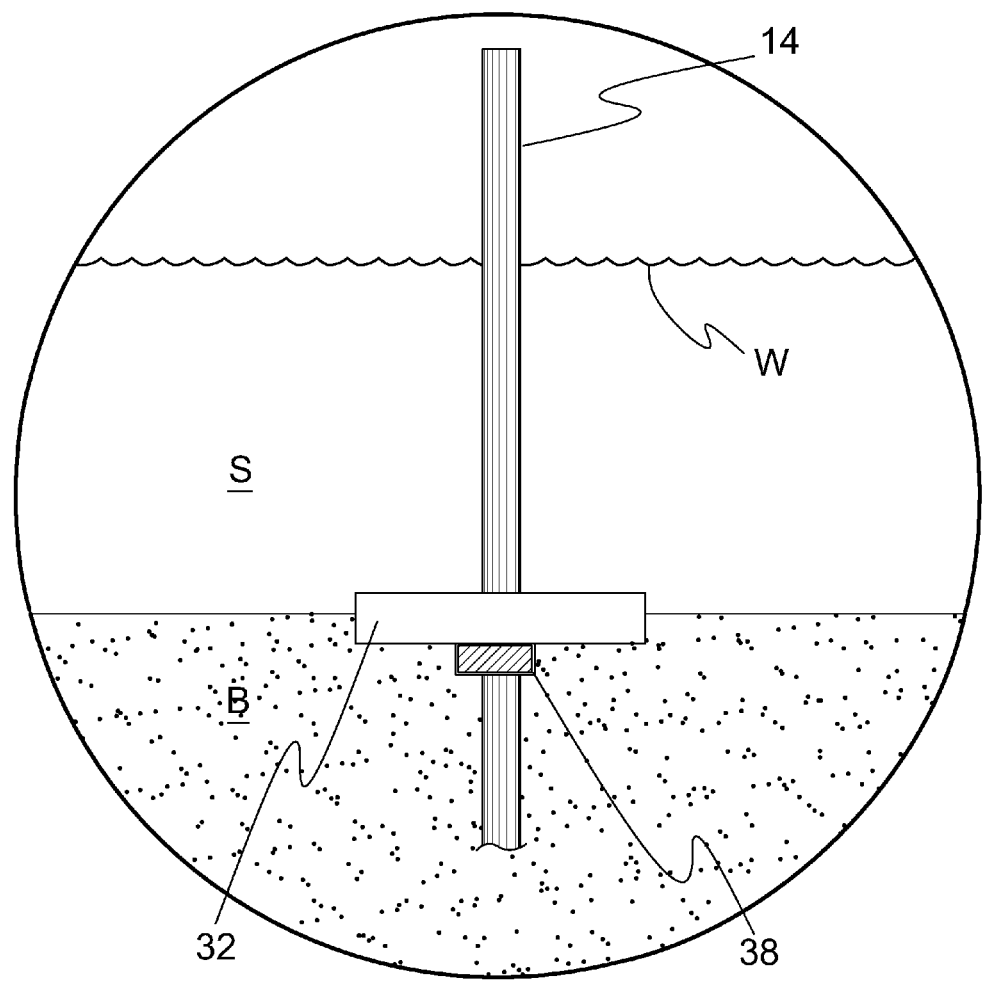
FIG. 8 is another side view of the assembly process for the living wave barrier.

Referring to FIG. 7, shown is a side view of one assembly process for a living wave barrier of the present invention. In this case, the living wave barrier (not shown in the Figure) is anchored to a piling that is inserted into the seabed with a stop washer As illustrated, the piling is inserted into the seabed with a stop washer located proximate the seabed. The stop washer allows for the is intended to fix the base module support platform in place. This is the embodiment or version of the invention that would be used if a wave barrier/habitat combination is desired offshore for wave attenuation, to provide a snorkeling or diving environment, or both. The stackable habitat modules by means of their throughbores, are then placed on the piling to the height desired. As will be discussed further below, more than one piling may be placed in a line to shelter a predetermined shoreline, or for other purposes, as needed Referring to FIG. 8, shown is another side view of the assembly process for the living wave barrier 10. The living wave barrier 10 is comprised of anchoring and support members 32, 38 for a plurality of stacked modules 12 (not shown). As aforementioned, a piling 14 is inserted into the seabed B with a stop washer 38 fixedly fastened thereto forming a stop wherethen a load bearing platform 32 having a throughbore is mounted onto the piling forming support for a plurality of the stacked modules 12 (not shown). The height of the piling 14 and, subsequently, the number of stacked modules 12 (not shown) would be determined both by the depth of the sea S and the user's desire to attenuate the waves, in which case the stacked modules 12 would reach or extend upward past the water surface W. Water surface W in this Figure could represent either the mean water height over the tidal cycle or could represent the high tide level at the location where the living wave barrier is being installed.

Figure 9:
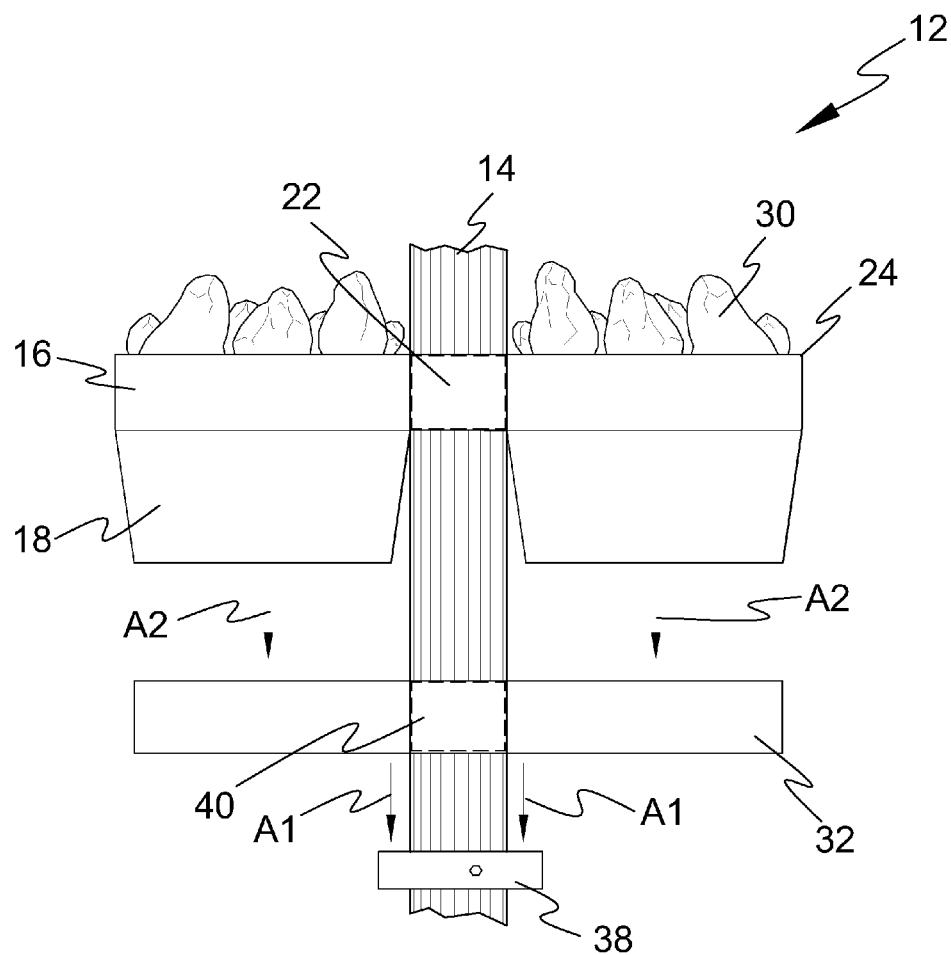
FIG. 9 is an additional side view of the assembly process for the living wave barrier.

Referring to FIG. 9, shown is a partial side view of the assembly process for the living wave barrier 10. The Figure shows the piling 14 and the associated module support platform washer 38. The base module support platform 32 is placed over the piling 14 by means of the module support platform throughbore at 40 as shown by directional arrows A1. After this step, habitat module 12 is set into place by means of platform module throughbore 22 as indicated by directional arrows A2.

Figure 10:
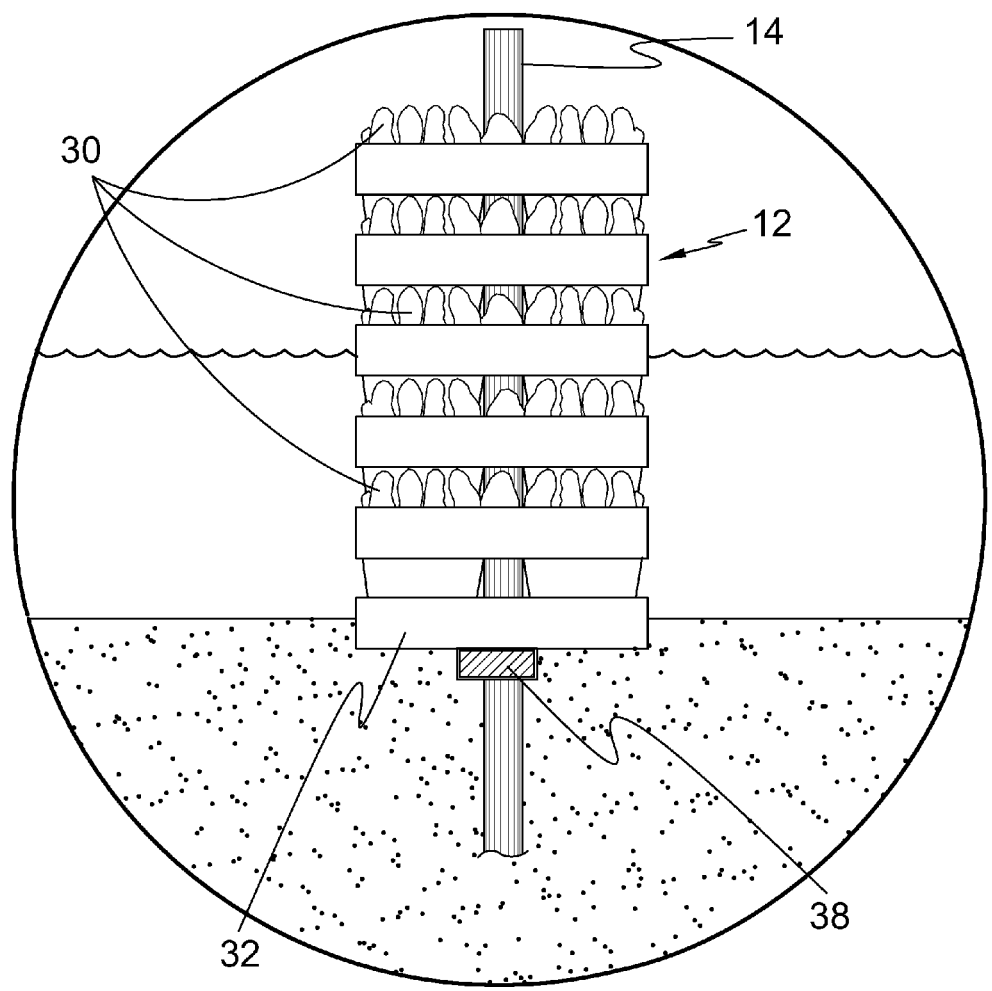
FIG. 10 is an illustrative view of the living wave barrier of the present invention.

Referring to FIG. 10, shown is an illustrative view of the living wave barrier of the present invention. Shown is one embodiment of the living wave barrier, comprising individual habitat modules stacked atop of each other forming a vertical pile. Each module has a platform with center piling aperture, footing receptacles to accommodate the stacking of other units and articles, such as stone, fixedly attached to the platform. A piling is secured into the sea floor with a stop washer. A load bearing platform with piling aperture is mounted onto the piling and is designed to carry the load of the piled stackable habitat modules that are mounted onto the piling.

Figure 11:
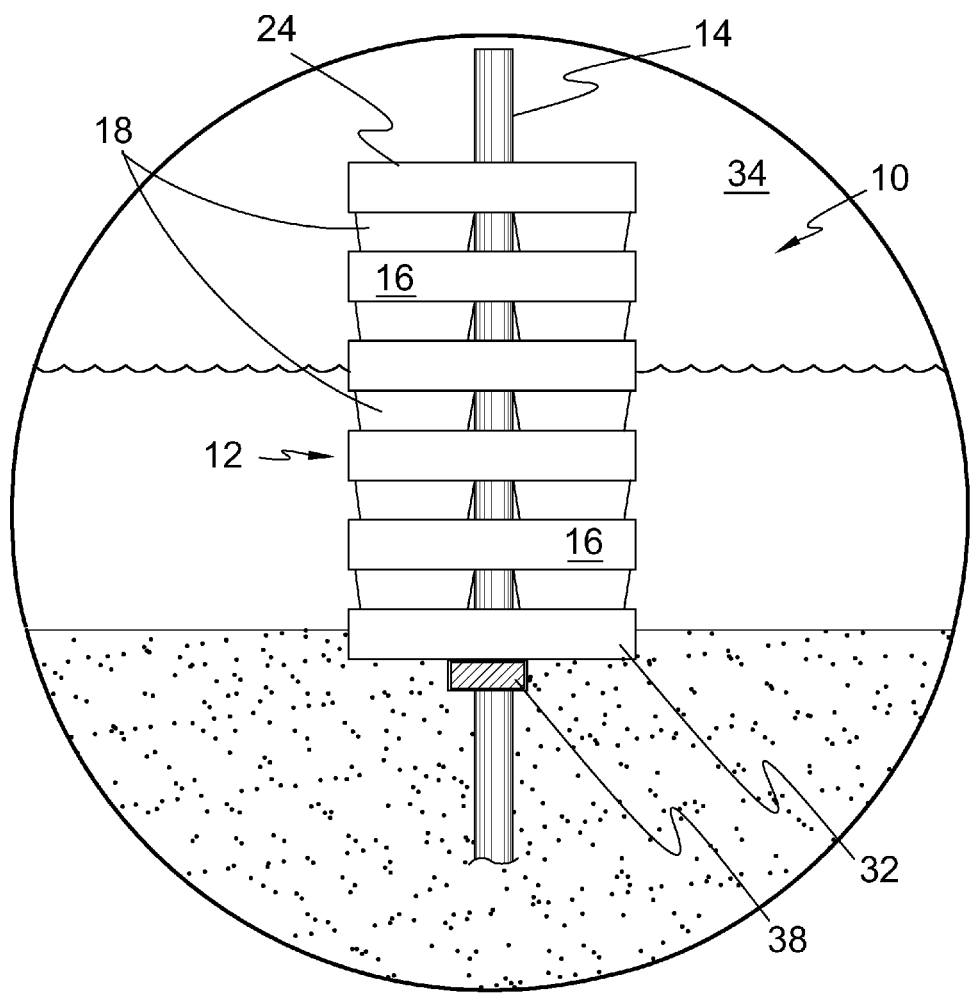
FIG. 11 is another illustrative embodiment of the living wave barrier of the present invention.

Referring to FIG. 11, shown is another illustrative embodiment of the living wave barrier 10 of the present invention. Shown is another embodiment of the living wave barrier 10 comprising individual stackable modules 12 stacked atop of each other to form a vertical pile. Each module 12 has a platform 16 with center piling aperture 22 and footing receptacles 28 receiving the footings 18 of the module 12 above. A piling 14 is secured into the sea floor B having a stop washer 38 supporting a stackable module load block mounted 32 onto the piling 14, the load block 32, in turn, supports the a plurality of stackable habitat modules 12 mounted onto the piling. The living wave barrier provides habitat for marine life and serves as a wave attenuator.

Figure 12:
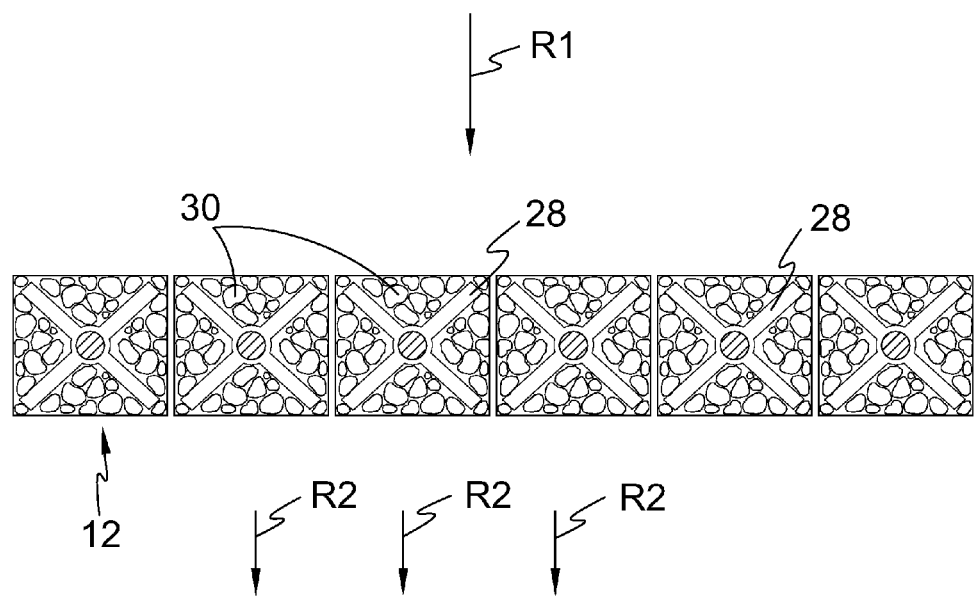
FIG. 12 is a top view of the living wave barrier embodiment comprising a plurality of anchored and stacked habitat modules.

Referring to FIG. 12, shown is a top view of an embodiment of the living wave barrier 10 that comprises a plurality of anchored and stacked habitat modules 12 positioned in a linear manner. Shown is an array of living wave barriers forming a wave attenuation system that extends above mean tide. Directional arrow R1 indicates the higher waves heading inshore while the directional arrows R2 indicate the attenuated or smoothed waves caused by interaction with the wave barrier 10 of the present invention. Note that other shapes or configurations of the stacked habitat modules are contemplated other than the linear one shown here. A U-shaped configuration, even a complete square (or substantially complete) could be constructed to create, for example a snorkeling park or other aquatic attraction. Additionally, it should be emphasized that the present invention is amenable to being attached to an existing pier or structure as has been discussed above and also may be anchored by the module support platform alone, as seen in FIG. 3 so that it is independent from any existing structure. These independent forms could be buoyed or otherwise marked for retrieval if they were desired to be temporary or experimental. Additionally, the articles attached to the living wave barrier could be of other types, such as a oil absorbing material and the wave barrier could be assembled and deployed off a beach to protect it.

What is claimed is new and desired to be protected by Letters Patent is set forth in the appended claims:

1. A living wave barrier for deployment proximate the shore of a body of water comprising:
    a stack of habitat modules, each said habitat module including a module platform having a top and a bottom and further including a throughbore therein extending from said platform top to said platform bottom to accommodate a piling;
    radially extending platform footings located on said platform bottom and extending downwardly away therefrom, said platform footings being spaced apart to allow fluid communication between edges of said module platform, each of said footings radially extending from a center of said platform, ends of said footings spaced from said throughbore and an outer edge of said platform, respectively;
    radially extending platform footing alignment recesses located on said platform top, said alignment recesses adapted to receive said platform footings of another said habitat module when said other habitat module is located above said habitat module, each recess having ends spaced from said throughbore and outer edge of said platform, respectively;
    a plurality of predetermined environmental articles located on said platform top arranged and constructed to allow sea water to flush in and around said articles;
    said stack of habitat modules vertically assembled such that they are held in a stable relationship to one another by said platform footings in combination with said platform footing recesses and that fluid communication exists between outer edges of each said platform to allow water flow through and past said habitat modules during a tidal cycle and that said predetermined environmental articles are exposed to the flow while said vertically stacked habitat modules serve as a wave barrier;
    said piling extending into a seabed, said piling provided with a securing member within said seabed, and said piling extending above mean tide for providing wave attenuation; and
    a surface on said module platform top further includes a removable portion adapted to receive oyster spat, and allowing reinstalling of said removable portion.

2. The living wave barrier according to claim 1 wherein said predetermined environmental articles are selected from the group consisting of plastics, metal, stone, concrete aggregate, and glass type material forming a suitable habitat for local aquatic organisms.

3. The living wave barrier according to claim 1 wherein said securing member comprises a post and washer combination extending downwards into the seabed.

4. The living wave barrier according to claim 3 wherein said platform footings being diagonally positioned to form a venture-like opening on each side of said module so that the ebb and flow of the tides will continuously flush the module to maintain water quality.

5. The living wave barrier according to claim 3 wherein said module platform and said platform footings both include internal rebar structure and where said platform throughbore is located proximate the center of said module platform and is dimensioned to receive an existing piling on a waterfront pier.

6. The living wave barrier according to claim 5 having a plurality of said anchored and stacked habitat modules are positioned adjacent to each other in a linear manner in a single row forming a wave attenuation system that extends above mean tide.

7. The living wave barrier according to claim 5 having a plurality of said anchored and stacked habitat modules are positioned adjacent to each other in a U-shaped manner forming a wave attenuation system that extends above mean tide.

8. The living wave barrier according to claim 5 having a plurality of said anchored and stacked habitat modules are positioned adjacent to each other in a square formation forming a wave attenuation system that extends above mean tide.

9. The living wave barrier according to claim 5 wherein said stack of modules is located under a pier.

* * * * *